(12) United States Patent
Jacobson et al.

(10) Patent No.: US 6,471,410 B1
(45) Date of Patent: Oct. 29, 2002

(54) COATED ROLLING ELEMENT BEARING

(75) Inventors: Bo Olov Jacobson, Lund (SE);
Eustathios Ioannides, Zeist (NL);
George Tin Yau Wan, Cheshire (GB)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 09/700,019

(22) PCT Filed: May 17, 1999

(86) PCT No.: PCT/NL99/00299
§ 371 (c)(1),
(2), (4) Date: Jan. 8, 2001

(87) PCT Pub. No.: WO99/58865
PCT Pub. Date: Nov. 18, 1999

(30) Foreign Application Priority Data

May 14, 1998 (NL) .............................................. 1009170

(51) Int. Cl.$^7$ ............................................... F16C 33/62
(52) U.S. Cl. ..................... 384/492; 384/907; 384/913
(58) Field of Search ................................ 384/492, 907, 384/913

(56) References Cited

U.S. PATENT DOCUMENTS

| | | | |
|---|---|---|---|
| 4,997,295 A | 3/1991 | Saitou | 384/492 |
| 5,067,826 A | 11/1991 | Lemelson | 384/492 |
| 5,112,146 A | 5/1992 | Stangeland | 384/492 |
| 5,593,234 A | 1/1997 | Liston | 384/492 |
| 5,840,435 A | * 11/1998 | Lieber et al. | 384/492 |
| 5,952,085 A | * 9/1999 | Rickerby et al. | 384/907 |

FOREIGN PATENT DOCUMENTS

| | | |
|---|---|---|
| EP | 0 531 082 A2 | 3/1993 |
| GB | 1 589 041 | 5/1981 |
| JP | 03255224 A | 11/1991 |
| JP | 09088975 | 3/1997 |
| WO | 99/14512 | 3/1999 |

* cited by examiner

Primary Examiner—Thomas R. Hannon
(74) Attorney, Agent, or Firm—Oliff & Berridge PLC

(57) ABSTRACT

A rolling element bearing comprises an inner ring (3) and an outer ring (2) each provided with a raceway (4, 5), said rings having land regions (10, 11) on opposite sides of their raceways, and a series of rolling elements (6) which are in rolling contact with the raceways and which are mutually spaced by a cage (7), said cage (7) engaging the land regions (10, 11) of said ring, and at least one of said rings (2, 3) being coated. Said at least one ring is coated with a wear and friction reducing, elastic coating over its full surface.

9 Claims, 1 Drawing Sheet

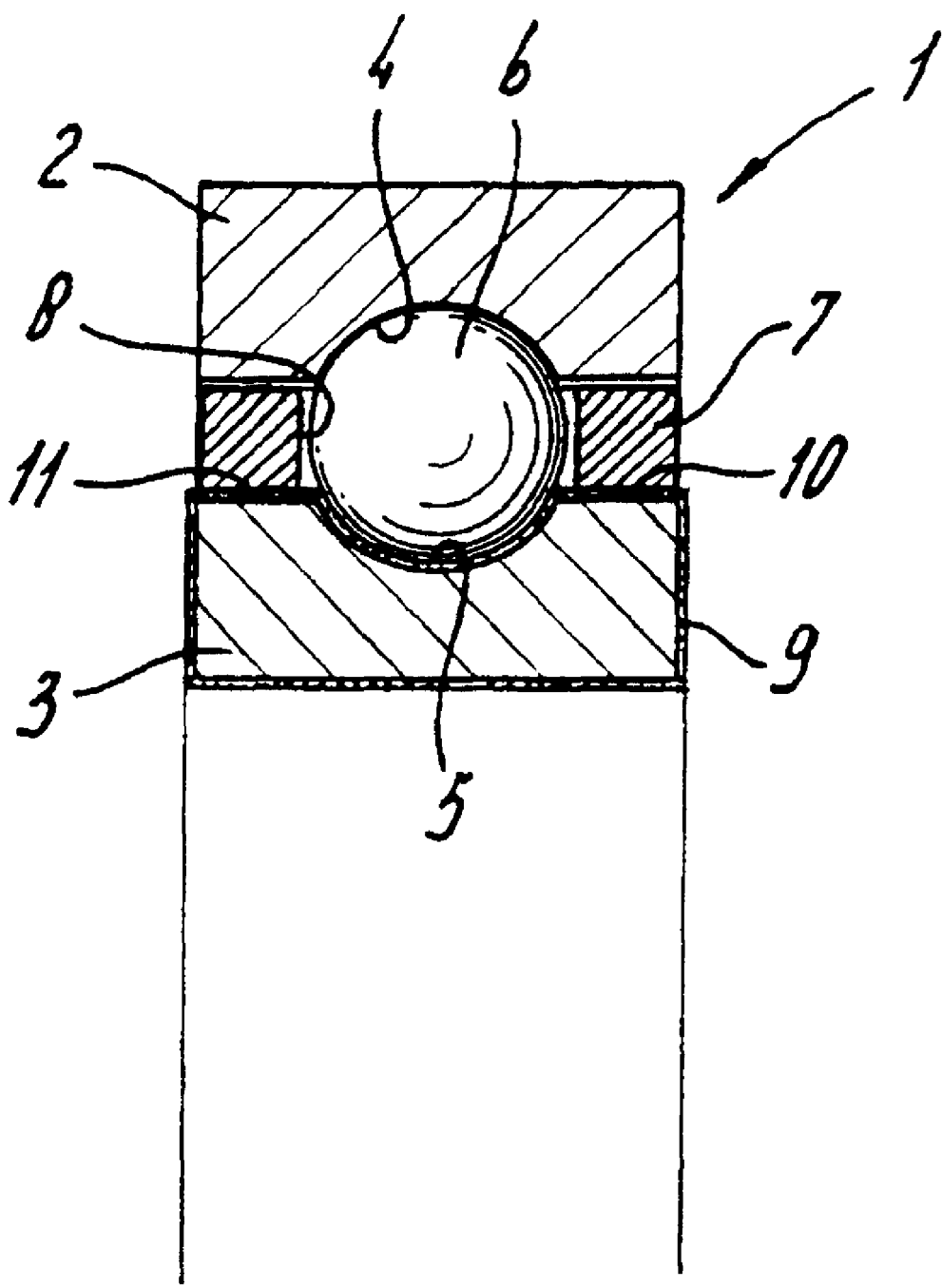

COATED ROLLING ELEMENT BEARING

BACKGROUND OF THE INVENTION

The invention is related to a rolling element bearing comprising an inner ring and an outer ring each provided with a raceway, at least one of said rings having land regions on opposite sides of the respective raceway, and a series of rolling elements which are in rolling contact with the raceways and which are mutually spaced by a cage, said cage engaging the land regions of said ring, said land regions being coated.

DESCRIPTION OF RELATED ART

Such rolling element bearing is known from EP-B-531082. The rolling elements are spaced by a cage, which rides on the lands provided on one of the rings next to the raceway thereof. Such bearing has the advantage that the cage is guided by the ring in question, which improves the dynamic behaviour of the ring and reduces whirl instability.

According to EP-B-531082, a hard coating is applied to each land of the ring, but not to the raceway thereof. Thereby, flaking off under the influence of the locally very high compressive forces which occur in the rolling contacts between the rolling elements and the raceways, is to be avoided.

SUMMARY OF THE INVENTION

The object of the invention is to provide a rolling element bearing in which the problem of the coating flaking off will not occur, which enables a relatively cheap manufacturing method, and whereby a proper guidance of the cage is maintained. This object is achieved in that said least one ring is coated with a wear and friction reducing, elastic coating over its full surface.

The coating applied both on the lands as well as on the raceway and the other surfaces of the bearing ring elastic, several advantages are obtained. First of all, it provides a desired guidance of the cage, such that swirl instability is avoided.

Secondly, the coating will not flake off from the raceway, in particular in case the coating has a thickness which is less than the depth beneath the raceway at which the shear stresses resulting from the rolling motion of the rolling elements, are maximal. A relatively thin layer can deform easily and follow the elastic deformation of the steel base material, when the ball rolls over the raceway. In contrast, in the case of a relatively thick coating, the stresses in the coating layer will be high and spalling or flaking off is more likely. Also a thick elastic coating is more difficult to adhere to the steel than a thin coating due to internal stresses in the coating layer.

As a consequence, according to a third advantage the bearing can be manufactured in an economic way. The layer thickness can be very small. Moreover the full surface of the bearing rings may be coated which is easier than coating only the lands thereof.

An advantage of a very small coating thickness is that the topography of the steel raceway is maintained, as a result of which the dynamic behaviour of the bearing is not impaired.

According to a preferred embodiment, the coating comprises a diamond-like carbon coating. In particular, the coating may comprise a metal containing diamond-like carbon, for instance alternating layers of metal such as W or WC and a hard morphous coating, such as diamond-like carbon.

According to a further embodiment, the coating may comprise of boron-nitride (BN), chromium nitride (CrN), hafnium nitride (HfN) niobiumnitride, carbonnitride or any other nitride, oxide such as boron oxide, or carbide or sulphide coating.

The maximum coating thickness may be about 2 $\mu$m; preferably, the maximum coating thickness is 1 $\mu$m.

Reference is made to U.S. Pat. No. 5,112,146, related to a rolling element bearing, the rings of which have a very hard, low fiction coating. Said coating however does not act as a support for a cage, nor is the entire surface of the bearings rings fully coated.

The coating can be deposited by means of physical vapour deposition (PVD), chemical vapour deposition (CVD) or pulsed laser deposition (PLD) techniques or through surface treatment like Ion Implantation or laser cladding or glazing.

In addition the hard coating can be further enhanced by another top coating that creates solid lubrication, thereby creating a very smooth interface between cage and ring through transfer of a solid lubricant layer to the counterface.

Such coating can be $MoS_2$ or $WS_2$ e.g. for applications where dry running in the rolling contact is possible.

BRIEF DESCRIPTION OF THE DRAWINGS

The invention will further be described with reference to the deep groove ball bearing shown in the FIGURE.

DETAILED DESCRIPTION OF THE PREFERRED EMBODIMENTS

The figure shows an axial cross-section through a deep groove ball bearing 1, having an outer ring 2 and an inner ring 3, each provided with a respective raceway 4, 5. The raceways 4, 5 are in rolling contact with a series of balls 6. These balls are mutually spaced by a cage 7, containing pockets 8.

The cage 7 is supported by the inner ring 3. In order to avoid swirl of the cage, the inner ring 3 has a coating 9 over its full surface. Thus, not only the raceway 5, but also the land 10, 11 bordering the raceway 5, as well as the rest of the outer surface of the inner ring 3 are coated.

The full coating of the outer surface of the inner ring 10 has the advantage that the proper, non-flaking surface of the raceway is obtained, as well as a proper swirl-free guidance of the cage.

What is claimed is:

1. Rolling element bearing, comprising an inner ring and an outer ring each provided with a raceway, at least one of said rings having land regions on opposite sides of the respective raceway, and a series of rolling elements which are in rolling contact with the raceways and which are mutually spaced by a cage, said cage engaging the land regions of said ring, said at least one ring being coated with a wear and friction reducing coating over its full surface including said land regions, wherein the coating comprises two coating layers, a supporting coating of a hard material and on a steel base material, and a $MoS_2$ or $WS_2$ coating layer on top of the supporting coating.

2. The bearing according to claim 1, wherein the coating has a thickness which is less than the depth beneath the raceway at which the shear stresses resulting from the rolling motion of the rolling elements are maximal.

3. The bearing according to claim 1, wherein the supporting coating comprises a diamond-like carbon coating.

4. The bearing according to claim 1, wherein the supporting coating comprises a metal containing diamond-like carbon.

5. The bearing according to claim 4, wherein the supporting coating comprises alternating layers of metal and diamond-like carbon.

6. The bearing according to claim 1, wherein the supporting coating comprises boron-nitride or hafniumnitride or niobiumnitride or carbonnitride.

7. The bearing according to claim 1, wherein the supporting coating comprises boron-oxide.

8. The bearing according to claim 1, wherein a maximum coating thickness is 2 $\mu$m.

9. The bearing according to claim 1, wherein a maximum coating thickness is 1 $\mu$m.

* * * * *